April 21, 1953

R. W. STINEMAN ET AL 2,636,132

ALTERNATOR REAL POWER EQUALIZING APPARATUS
FOR MULTIPLE ALTERNATOR SYSTEMS

Filed May 13, 1952

INVENTORS
RUSSELL W. STINEMAN
JOHN W. WARD

BY Reynolds, Beach & Christensen

ATTORNEYS

Patented Apr. 21, 1953

2,636,132

UNITED STATES PATENT OFFICE 2,636,132

ALTERNATOR REAL POWER EQUALIZING APPARATUS FOR MULTIPLE ALTERNATOR SYSTEMS

Russell W. Stineman and John W. Ward, Seattle, Wash., assignors to Boeing Airplane Company, Seattle, Wash., a corporation of Delaware Application May 13, 1952, Serial No. 287,482

8 Claims. (Cl. 307—57)

This invention relates to control apparatus for electric power generating and distribution systems, and more particularly concerns the control of alternator prime movers in a manner establishing and maintaining a desired, normally equal, load division as between independently driven, parallel-connected alternators of a multiple alternator system. The invention is herein illustratively described by reference to a three-phase system of four parallel-connected alternators intended for aircraft use and wherein the alternators are of equal size or capacity. However, it will be appreciated that the particular nature of the control apparatus provided and the principles involved in the operation thereof, within the scope of the invention, apply within a variety of situations and with any number of interconnected alternators greater than one, whether the alternators be of equal rated capacity or intended loading, whether of a three-phase type, or otherwise.

When operating two or more independently driven alternators in parallel, it is obviously desirable, if the alternators be of equal rated capacity, to have them loaded approximately equally. Thus the degree of possibly dangerous overloading of any one alternator will be minimized because of the equal division of overload assumed by all the alternators. Also the power-generating efficiency of the system as a whole is higher if the load is divided equally among the several alternators. In addition, the setting of the protective apparatus tends to be less critical for its intended purpose when the load borne by the different alternators is equalized. For these and other reasons various devices have been proposed heretofore which accomplish the load-equalizing function, some with more success than others. All operate upon the principle of controlling the prime movers driving the individual alternators, of course, because it is essentially the speed-load characteristic of each alternator's prime mover relative to that of the others that determines the division of load.

The general object of the present invention is to provide alternator load-equalizing apparatus which is simpler and requires fewer elements than previous devices performing a similar function. Moreover, the invention is directed to the provision of a sensitive, quick-acting load division control capable of providing the necessary corrective action to maintain the prescribed alternator load division without being unstable or tending to hunt with respect to the correct setting.

Still another object of this invention is apparatus of the nature indicated which is capable of utilizing control components already present in certain conventional voltage regulated multiple alternator systems, i. e., components of the equalizer loop interconnecting the several voltage regulators, so that the added cost and complexity of incorporating the present invention in such systems is further minimized.

Another object of the invention is apparatus of the nature indicated which is particularly lightweight, compact and reliable in operation, hence lends itself very well to aircraft systems and the like wherein such attributes are naturally of extreme importance.

A further object is a device of the type mentioned capable of utilizing a motivating source for actuating the prime mover speed control adjusting element, which source constitutes a standard, commercially available device or product in itself inherently incorporating certain sensing components which in effect detect and act upon the condition of unbalance of real power of the particular alternator with respect to the average of all the alternators, and largely without regard to variations in total load on the system or in system voltage. Such a motivating means in accordance with the present invention comprises a conventional two-phase induction motor.

Described in brief terms, the illustrative embodiment of the invention comprises, in association with each alternator, a separate two-phase induction motor drivingly connected to the corresponding prime mover's speed control adjusting element, i. e., such as a nozzle valve control element in the case of an air turbine functioning as the prime mover, for example. One phase winding, herein termed the "reference winding" of the induction motor is energized by a reference voltage representing the voltage of one alternator phase terminal, and the other phase winding, herein termed the "control winding" of the induction motor is energized by a current representing the vector difference between one phase current of the particular alternator and the average of the corresponding currents of all the alternators. By means of reactance added in each of the two winding circuits of the motor, the energizing current in the reference winding is placed at 90 degrees to that component of current in the control winding which represents alternator real current, and at 180 degrees to the reactive current representative component. The control winding energizing circuit is so arranged that the real current component in the control winding is zero, if the particular alternator is loaded in real power equally to the average loading of all the alternators, whereas a relative increase of real power loading of the particular alternator produces a control winding current of one phasing and a relative decrease of such loading produces a control winding current of the opposite phasing, causing generation of corrective drive torque in the induction motor in one direction or the other, respectively, in a manner characteristic of two-phase induction motors. The motor torque is generated in such a sense that the prime mover speed control adjusting element moved thereby restores the real power load division of the particular alternator to equality with the average of all the alternators as desired. As long as such equality of load division exists, the several two-phase induction motors do not rotate. Reactive current representative components in the motor control winding do not produce motor torque therein due to the fact that they are either in phase or 180 degrees out of phase with respect to the reference winding current.

These and other features, objects and advantages of the invention including certain details of the illustrative embodiment thereof will become more fully evident from the following description by reference to the accompanying drawings.

Figure 1:
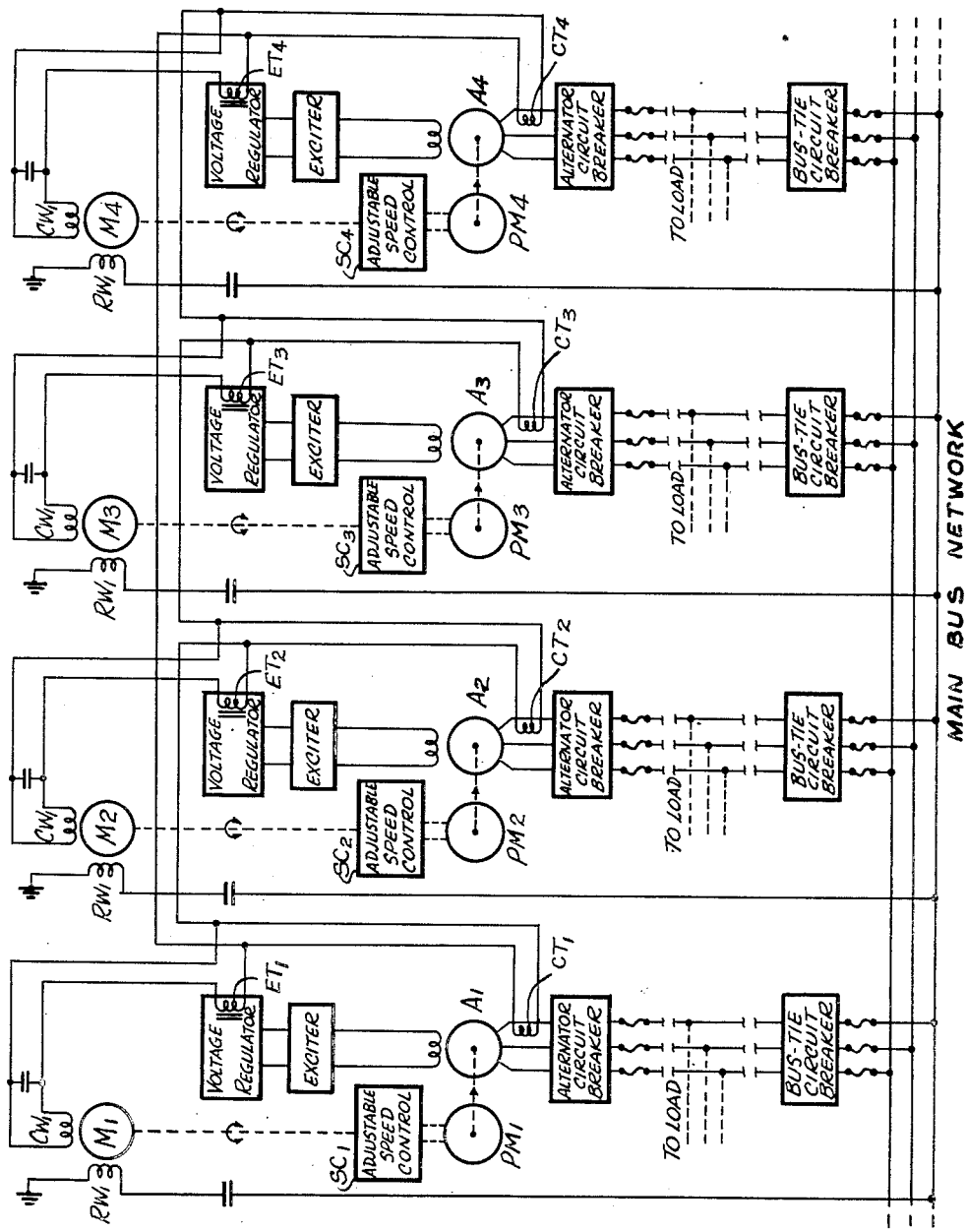
Figure 1 is a simplified schematic diagram of the illustrative system incorporating control apparatus representing the preferred embodiment of the invention.

As shown in Figure 1, the four alternators $A_1$, $A_2$, $A_3$ and $A_4$, driven respectively by prime mover $PM_1$, $PM_2$, $PM_3$ and $PM_4$, such as air turbines, are connected respectively to individual, preferably equal sections of load through individual alternator circuit breakers, and are cross-connected by the main bus network. Suitable limiters and bus-tie circuit breakers are provided in conventional manner, and the exciter of each alternator is controlled by an individual voltage regulator. Action of the several voltage regulators is coordinated by an equalizer loop in conventional manner for the purpose of equalizing reactive current loading of the several alternators. This equalizer loop comprises the current transformer windings $CT_1$, $CT_2$, $CT_3$, $CT_4$ coupled respectively with one phase conductor of the correspondingly numbered alternators. The current transformer windings are connected in an endless series loop. Individual voltage regulator excitation windings $ET_1$, $ET_2$, $ET_3$ and $ET_4$ connected across the respective current transformer windings in the loop control the action of the voltage regulators for the purpose just mentioned.

The prime mover of each alternator has an adjustable speed control designated SC individual thereto. In the case of an air-impelled turbine, for instance, as the prime mover, this control may comprise a variable air valve adjusting element controlling pressure or flow of air through the turbine nozzles. The effect of making an adjustment of the speed control device of an individual prime mover is, of course, to increase or decrease the torque tending to accelerate or decelerate the prime mover and alternator driven thereby. Because the alternators remain synchronous, however, due to flow of synchronizing currents between their windings, the end result of a prime mover speed control adjustment is to change the division of load as between the particular alternator and the remaining alternators.

In accordance with the illustrative preferred embodiment of this invention the individual prime mover speed controls $SC_1$, $SC_2$, $SC_3$ and $SC_4$ are adjustably driven by the respective two-phase motors $M_1$, $M_2$, $M_3$ and $M_4$, in accordance with excitation of the two separate phase windings of each such motor. The respective motor reference windings $RW_1$, $RW_2$, $RW_3$ and $RW_4$ are energized by the voltage-to-ground of one alternator phase conductor or terminal, such as that designated "C" in the diagram. The respective motor control windings $CW_1$, $CW_2$, $CW_3$ and $SW_4$, on the other hand, are energized in the same manner as the corresponding voltage regulator excitation windings $ET_1$, $ET_2$, $ET_3$ and $ET_4$, respectively. That is the motor control windings are connected across the corresponding alternator current transformer windings; being connected in series with the voltage regulator excitation windings $ET_1$, $ET_2$, $ET_3$ and $ET_4$ in the illustrated case.

Figure 2:
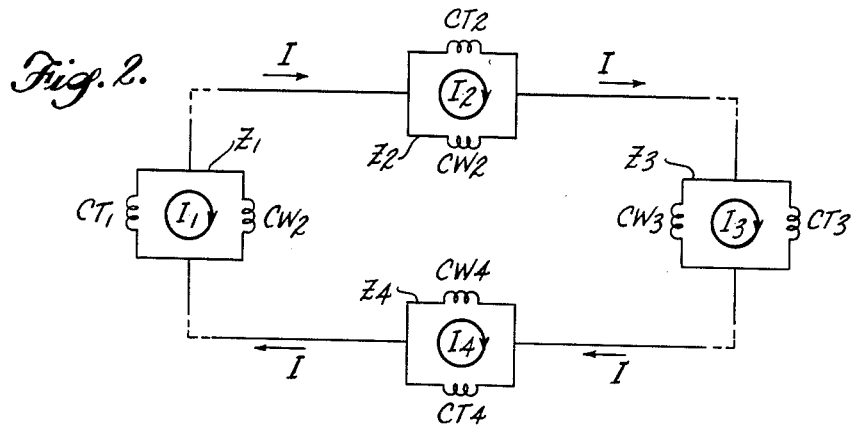
Figure 2 is an analytical circuit diagram illustrating the nature and operation of a current-transformer-energized equalizer loop by which current vector differences are derived for application to the individual two-phase motor control windings in each of the four alternator control sections of the apparatus.

The effect of connecting the motor control windings across the respective current transformer windings in the equalizer loop is to produce certain currents in the individual control windings, the current in any instance representing the vector difference between the selected phase current in the particular alternator and the mean of the corresponding currents in all the alternators. This relationship may be seen by writing the loop voltage equation for Figure 2 and solving for the currents. Thus, assuming equality of the impedances $Z_1$, $Z_2$, $Z_3$ and $Z_4$ (each equal to $Z_E$), representing the impedances of the respective loop branches comprising the individual motor control windings $CW_1$, $CW_2$, $CW_3$ and $CW_4$, the loop voltage equation becomes:

(1) $n\dot{I}Z_E - \dot{I}_1 Z_E - \dot{I}_2 Z_E - \dot{I}_3 Z_E - \dot{I}_4 Z_E \ldots - \dot{I}_n Z_E = 0$ Solving for the currents, (2) $\dot{I} = \dfrac{\dot{I}_1 + \dot{I}_2 + \dot{I}_3 + \dot{I}_4 \ldots + \dot{I}_n}{n}$ So that (3)

$\dot{I}_{CW_1} = \dot{I}_1 - \dot{I}; \dot{I}_{CW_2} = \dot{I}_2 - \dot{I}; \dot{I}_{CW_3} = \dot{I}_3 - \dot{I}; \dot{I}_{CW_4} = \dot{I}_4 - \dot{I}$ as previously indicated, $\dot{I}$ being the mean vector current of all the alternators and $\dot{I}_{CW_1}$, $\dot{I}_{CW_2}$, $\dot{I}_{CW_3}$ and $\dot{I}_{CW_4}$ being the net vector currents in the correspondingly numbered motor control windings.

Figure 3:
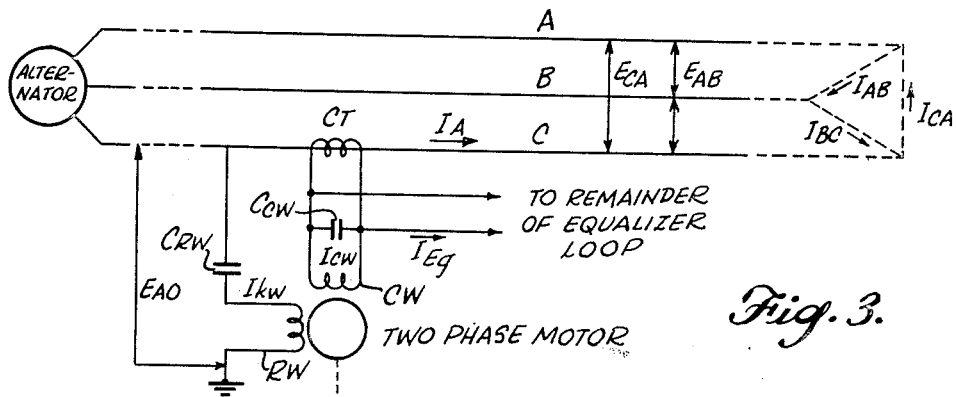
Figure 3 is a circuit diagram illustrating the two-phase motor connections in one alternator prime mover control section of the apparatus.
Figure 4:
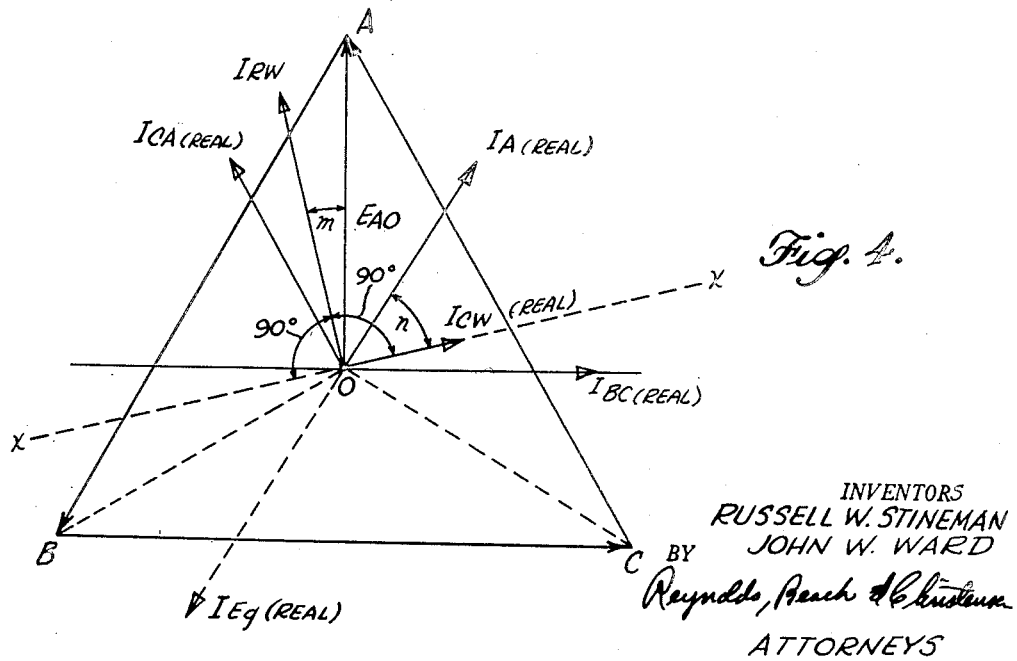
Figure 4 is a vector diagram illustrating the relationship of certain currents and voltages determining operation of the control motor of Figure 3.

In the vector diagram of Figure 4 certain voltages and currents are represented which explain the operation of the two-phase motor associated with each alternator and prime mover speed control, as in the representative section of the system shown in Figure 3. The vector triangle A, B, C represents the system three-phase voltages and the reference voltage vector $E_{OA}$ represents the voltage-to-ground of one phase conductor, applied to the circuit of motor reference winding RW. The actual current $I_{RW}$ flowing in this reference winding is caused, by the series condenser $C_{RW}$, to lead the phase of the voltage $E_{OA}$ by a phase angle $m$. The real component $I_A$(Real) of current flowing in the alternator phase conductor A linked by the current transformer CT represents the vectorial resultant of the real components $I_{CA}$(Real) and $I_{BC}$(Real) of currents flowing in the delta-connected alternator load, as depicted by dotted lines in the right-hand portion of Figure 3. The vector $I_{CW}$(Real) represents current flowing in motor control winding CW corresponding to the difference between the particular alternator's phase conductor real current $I_A$ and the corresponding real currents of all the alternators and is caused by parallel condenser $C_{CW}$ to lag in phase behind the current $I_A$(Real) by the phase angle $n$, as indicated. The condensers $C_{RW}$ and $C_{CW}$ are so chosen as to size that current vector $I_{CW}$(Real) lies along line X—X at 90° phasing to the current vector $I_{RW}$, and may either lag or lead the vector $I_{RW}$ by 90 degrees depending upon whether the particular alternator is generating more or less than its proper divisive share of real power in the system.

The generation of torque by a two-phase induction motor being dependent upon currents at 90 degree phasing in the two field windings of the motor, it will be evident that the two-phase motor in Figure 3 is caused to adjustably move the prime mover speed control solely in response to the difference between the real component of phase current $I_A$ in the particular alternator and the mean of similar current components of all the alternators of the system. The phase of the reference current $I_{RW}$ in the reference winding RW is the same or constant in all the control motors, that is, it constitutes the phase reference. Thus if the real component of current $I_A$ in any alternator differs from the mean of all in the system, the motor will rotate in a direction to correct the torque setting of that alternator's speed control and thereby restore that alternator to load equality with the others in the system.

When the alternator loads are balanced the currents $I_{CW}$(Real) in the induction motor control windings are zero and the motors do not turn. Moreover, slight or inappreciable departures from the condition of load balance produce such small currents $I_{CW}$(Real) that the induction motors will not respond, due to mechanical friction in the system. This is desirable because the control apparatus thereby is enabled to reject slight fluctuations of control currents and voltages tending to cause it to oscillate with respect to the correct equilibrium condition or setting. Nevertheless any persistent departures of appreciable magnitude from the equilibrium condition obviously produce corrective torque in one or more induction motors, which is quickly effective to prevent appreciable disturbances in the load division among the several alternators. Moreover, variations of total load on the system or of system voltage, while affecting motor torque, will not prevent the desired corrective action should unbalances occur, due to the nature of a two-phase motor.

Should the system develop a fault causing large unbalances, the motor control windings CW may be protected against excessive currents by utilizing current transformers which saturate before the motor energizing voltages generated thereby rise to dangerous values. In the event saturable current transformers are used, however, it will usually be desirable to employ a separate additional set of such current transformers and a separate equalizer loop including them in series, in order to control operation of the voltage regulators for equalizing reactive power between alternators.

These and other design considerations indicating the nature and most efficient mode of application of the invention as herein disclosed, including equivalent forms and expected modifications and variations therein will be apparent to those skilled in the art from the foregoing disclosure. It is the intention, accordingly, that the following claims be construed as broadly as reasonable in the light of the specification and the understanding of those skilled in the art in order to give full effect to the true spirit and nature of the invention defined thereby.

We claim as our invention:

1. In a multiple alternator system having therein a plurality of alternators, independent prime movers for the respective alternators, and adjustable speed control means for the respective prime movers operable to vary the loading of the individual alternators relative to the remaining alternators, alternator load division control apparatus comprising a plurality of two-phase induction motors drivingly connected individually to the respective prime mover speed control means, said induction motors each having a reference winding energized by alternator voltage, and a control winding, means deriving alternating currents representing the difference between the currents of the individual alternators respectively and the mean of all such alternators, for energization of the respective motor control windings, and phase-shift means associated with the motor windings establishing substantially 90 degree phasing in each such motor between energizing current in the reference winding thereof and the component of energizing current in the corresponding control winding representing real current of the particular alternator, respectively, for driving the individual speed control means and thereby maintaining predetermined load division among the alternators.

2. The system and load division control apparatus defined in claim 1, wherein the current deriving means comprise current transformers operatively linked with the respective alternators and connected together in endless series loop circuit, the motor control windings being connected across the current transformers of their particular alternators, respectively.

3. The system and control apparatus defined in claim 2, wherein the phase-shift means comprise condensers connected in series with the individual motor reference windings, respectively, and condensers connected in parallel with the individual motor control windings, respectively.

4. Load equalizing apparatus for multiple alternator systems comprising independent prime movers for the individual alternators and adjustable speed control elements for the prime movers, said apparatus comprising, associated with each alternator, a two-phase induction motor drivingly connected to the prime mover speed control element of the particular alternator, means energizing one winding of said induction motor by reference alternating current of constant phase relation to alternator voltage, and means energizing the second winding of said induction motor by control alternating current proportional to alternator real current and at 90 degree phasing to said reference current, and means subtracting from said control alternating current in the second winding of each motor an alternating current equal to the mean of said control alternating currents for all the motors, whereby said speed control means are individually adjusted for maintaining a predetermined load division among the alternators.

5. Load equalizing apparatus defined in claim 4, wherein the means energizing the second windings of the induction motors comprise current transformers operatively linked with corresponding phase conductors of the respective alternators, and the means effecting subtraction of the mean value of the control alternating currents comprises a conductive loop wherein the current transformers are connected in series relationship.

6. Load equalizing apparatus for multiple alternator systems comprising independent prime movers for the individual alternators and adjustable speed control elements for the prime movers, said apparatus comprising control circuit means including, in association with each alternator, a reference conductor carrying reference alternating current of constant phase relation to alternator voltage, a control conductor subject to control alternating current related in phase and magnitude to alternator real current and phased at substantially 90 degrees to said reference alternating current, and means interconnecting all the control conductors and subjecting each control conductor to alternating voltage productive of an alternating current therein equal to the mean of said control alternating currents but opposite in phase relative to the control alternating currents of the individual control conductors, and independent drive means for the individual alternator prime mover speed control elements energized responsively to the reference and control conductor alternating currents of the particular alternators, respectively, to adjust such speed control elements in one sense when said mean current exceeds the control current of the particular alternator's control conductor and in the opposite sense when such control current exceeds said mean current.

7. Load equalizing apparatus defined in claim 6, wherein the control circuit means comprises, in association with each alternator, a control-current-generating current transformer operatively linked with a phase conductor of the particular alternator, and the means productive of current of opposite phase in the control conductors comprises an equalizer loop interconnecting the current transformers in series relationship, with the respective control conductors being connected across corresponding current transformers.

8. Load equalizing apparatus defined in claim 7, wherein the transformer is wound for saturation thereof under abnormal excitation caused by phase conductor current in excess of normal load current.

RUSSELL W. STINEMAN.
JOHN W. WARD.

No references cited.